United States Patent [19]

Wormser

[11] 4,149,559
[45] Apr. 17, 1979

[54] PRESSURE REGULATOR

[75] Inventor: Alex F. Wormser, Marblehead, Mass.

[73] Assignee: Wingaersheek, Inc., Peabody, Mass.

[21] Appl. No.: 877,655

[22] Filed: Feb. 14, 1978

Related U.S. Application Data

[60] Continuation of Ser. No. 688,884, May 21, 1976, abandoned, which is a division of Ser. No. 500,132, Aug. 23, 1974, Pat. No. 3,972,346.

[51] Int. Cl.² ............................................. F16K 31/12
[52] U.S. Cl. ............................ 137/505.18; 137/505.26
[58] Field of Search ....................... 137/505.18, 505.26

[56] References Cited

U.S. PATENT DOCUMENTS

| 404,504 | 6/1889 | Ross | 137/505.18 |
|---|---|---|---|
| 941,153 | 11/1909 | Krichbaum | 137/505.18 |
| 3,179,123 | 4/1965 | Kowalski | 137/505.18 X |

Primary Examiner—Harold W. Weakley

[57] ABSTRACT

A pressure regulator comprising a body having an inlet, a first channel, an outlet for passage of gas therethrough and a chamber, a valve located within the channel between inlet and outlet for regulating outlet pressure, the inlet being in effective communication with the chamber through the valve, and a slide contacting the valve, reciprocally moveable within the chamber of the body so as to open or close the valve, biased in a direction tending to open the valve, and responsive in a direction tending to close the valve to pressure of gas which has passed through the valve into the chamber, featuring in one aspect a seal located between the body and slide to prevent the escape of gas therebetween, the seal having an annular base and an annular lip resiliently connected to the base, the base and lip forming a pocket for the gas so that the pressure of the gas helps to bias the lip outward from the base to provide an improved sealing effect, and featuring in another aspect a valve having a reciprocally moveable poppet and shaft, wherein the shaft has a shoulder, inlet gas pressure bears on the poppet and shoulder in opposite directions so that the net inlet gas force on the poppet and shaft is proportional to the difference in poppet and shoulder projected areas, and a seal located between said shaft and said body for preventing the passage of gas through said first channel between said inlet and said chamber of said body.

8 Claims, 3 Drawing Figures

PRESSURE REGULATOR

This is a continuation of application Ser. No. 688,884, filed May 21, 1976, now abandoned which is a division of application Ser. No. 500,132, filed Aug. 23, 1974 and granted as U.S. Pat. No. 3,972,346.

BACKGROUND OF THE INVENTION

This invention relates to pressure regulators.

Conventional diaphragm pressure regulators regulate gas pressures with acceptable accuracy, but require a large number of components. For example, in the typical diaphragm regulator shown in the *Gas Regulator Handbook*, published by Rockwell Manufacturing Company, Pittsburgh, Pa., 1959, p. 26, a separate adjusting screw is needed to compress the main spring, several parts are needed to couple the spring to the diaphragm, and the valve assembly below the diaphragm comprises several parts. It is desirable to minimize the number of parts in order to reduce the number of assembly operations to facilitate automation of the manufacture of the regulators with consequent reduction of manufacturing cost.

Piston pressure regulators require many fewer parts than do diaphragm regulators. For example, by screwing the cap into the base, the main spring is compressed without the need for a separate adjusting screw, and a piston and seal replace the diaphragm assembly. However, the friction force of the seal subtracts directly from the main spring force, thereby changing the outlet pressure. This friction is erratic, since piston regulators use O-ring seals which have a stick-slip characteristic, and can cause oscillations in use. Hence errors are generally greater than with the diaphragm regulator. Piston regulators also tend to be longer than diaphragm regulators, because three elements are assembled in line: the base, the piston, and the spring. The piston length/diameter ratio must be at least 1:1 to prevent jamming. A diaphragm, on the other hand, takes up almost no space lengthwise in the regulator. It is desirable to make a pressure regulator as compact as possible-lengthwise and widthwise.

One prior art piston device currently available on the market is the Fuel Gas Pre-Set Regulator No. 8060032 (CGA-510) manufactured by Air Reduction Co., Inc. of New York, N.Y. It uses an O-ring seal which is not annular with the spring but located below it. A piston device using an O-ring which is annular with the spring is described in Mays U.S. Pat. No. 3,791,412.

SUMMARY OF THE INVENTION

The invention provides a simple, compact, inexpensive, easy-to-manufacture, particularly by automation, adjustable, reliable, accurate, safe and convenient to use, rugged, and quiet pressure regulator having few components.

The invention can be used to regulate high and intermediate inlet pressures, and it provides for easy adjustment of the outlet pressure setting without the need for a separate adjusting screw. The invention has many fewer parts than a conventional diaphragm regulator, yet it is comparable with such a regulator in its accuracy. The use of a seal having a resilient lip so minimizes friction that ratio of seal diameter to valve hole diameter can be made large enough to provide accuracy. The compactness and short length of the pressure regulators of the invention protect them from accidental damage as by tipping a fuel tank to which the device is attached. The invention provides a regulator that does not leak in the off position or when dropped or jarred; further it provides an adjustable cap that will not come off the regulator. The regulators of the invention do not suffer from internal oscillations of "hum"; they are versatile in having a variety of locations for attachment of gages and fittings.

In general the invention in one aspect features a pressure regulator comprising a body having an inlet, a first channel, and outlet for passage of gas therethrough and further having a chamber, a valve located within the first channel between the inlet and outlet for regulating outlet pressure, the inlet being in effective communication with said chamber through said valve, a slide contacting the valve, reciprocally moveable within the chamber of the body so as to open the valve in one direction and so as to close the valve in the opposite direction, biased in a direction tending to open the valve, and responsive in a direction tending to close the valve to the pressure of gas which has passed through the valve into the chamber, and a seal located between the body and the slide to prevent the escape of gas therebetween, the seal having an annular base and an annular lip resiliently connected to the base, the base and lip forming a pocket for the gas so that the pressure of the gas helps to bias the lip outward from the base to provide supplemented sealing effect. In another aspect the invention features a valve having a poppet and a shaft, the poppet being connected to the shaft and reciprocally moveable with the shaft within the first channel so as to open the valve in one direction and so as to close the valve in the opposite direction, the shaft having a shoulder spaced from the poppet so that inlet gas pressure bears on the shoulder in one direction and bears on the poppet in the opposite direction, whereby the net force of the gas on the poppet and shaft is proportional to the difference in poppet and shoulder surface areas facing the gas pressure and projected in a plane, and a seal located between the shaft and the body for preventing the passage of gas through the first channel between the inlet and the body chamber. Preferred embodiments feature a U-ring as the seal; a spring to bias the slide to open the valve, wherein the slide has a chamber for carrying the spring and the seal is located annularly with the spring and intermediate the length of the spring; a cap having a female threaded portion, the body having a male threaded portion, the spring extending between the cap and the slide chamber so that the cap and the body cooperate through the threaded portions to provide adjustability of the spring force whereby the outlet pressure of the gas may be selectively changed; a stop ring connected to the cap and located between the body and the cap and annular therewith to limit the travel of the cap with respect to the body for calibrating the regulator and for retaining the cap on the body, the stop ring having a plurality of spaced protuberances bearing against the body to brake the movement of the cap with respect to the body; a cylindrical body chamber and a cylindrical slide portion reciprocally moveable therein; a slide lip externally annular with the slide, the seal being located between the slide lip and the body and having an effective outer diameter at its seal lip of 1.015 inches; a valve having a stem biased by the valve to protrude therefrom thereby to close the valve, the slide being biased to depress the stem toward the valve thereby to open the valve; and a first check valve located within the inlet to prevent backflow of gas, the outlet comprising a channel extending through the body, the first channel entering the outlet channel intermediate of the length of the outlet channel, and a second check valve located at one end of the outlet channel to act as a safety valve for passage of gas if the gas is prevented from flowing through the other end of the outlet channel. In certain preferred embodiments the valve is a tire valve, and has a poppet and a seat, the poppet being reciprocally moveable into and out of contact with the seat so as to close and open the valve, the poppet being responsive to inlet gas pressure in a direction tending to close the valve, the seat having a surface area with an effective diameter of 0.101 inch. In certain other preferred embodiments the shoulder and poppet projected areas are equal so that the net force of the inlet gas on the poppet and shaft is substantially eliminated; the shoulder and poppet projected areas each have a diameter from 0.130 inch to 0.2 inch; the poppet has a male hemispherical portion, and the valve further comprises a seat having a female conical portion for contacting the male poppet portion and an opening therethrough for passage of gas from inlet to outlet and through which the shaft extends, the seat being located between the inlet and the poppet, biasing means tending to move the male poppet portion against the female seat portion so as to close the opening and thereby to close the valve, and a stop for retaining the seal within the first channel; and the body has a second channel which connects the outlet and body chamber whereby the inlet effectively communicates with the chamber through the valve and the slide is thereby made responsive to the pressure of gas which has passed through the valve.

Other advantages and features of the invention will be apparent from the description and drawings herein of preferred embodiments thereof.

DESCRIPTION OF THE PREFERRED EMBODIMENTS

Figure 1:
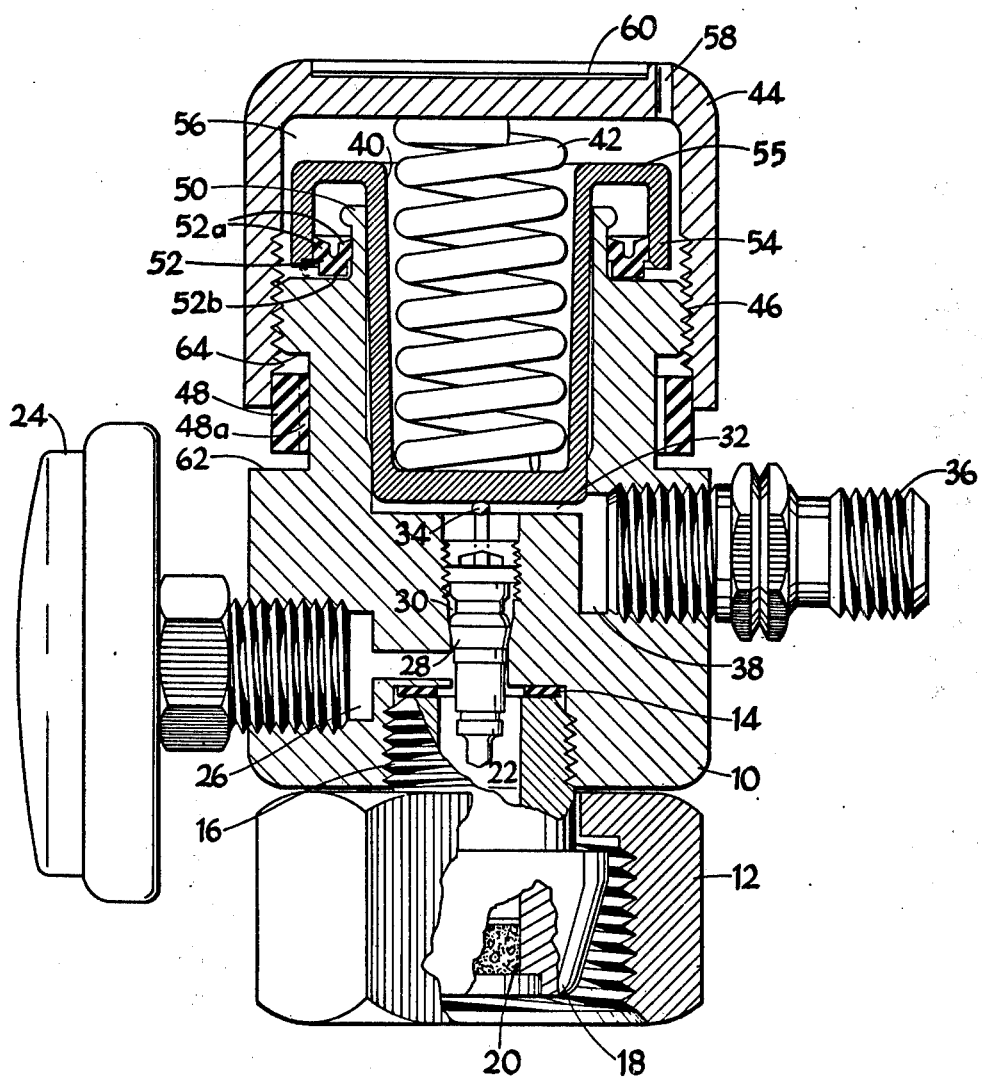
FIG. 1 is a partial side elevation view, partially broken away along a vertical plane, of one embodiment of the invention.

In the pressure regulator embodiment of FIG. 1, there is shown a body 10 over nut 12, which threadably receives the male threaded opening of a tank of pressurized gas (not shown). Screwthreadedly secured in the female threads in body 10 above nut 12 and seated against airtight washer 14 is male threaded portion 16 of nipple 18. When nut 12, which is retained below body 10 by nipple 18, is screwed onto the tank, the outer curved surface of nipple 18 is drawn into a gas-tight seal located within the tank opening, so that gas must leave the tank through nipple 18, passing through filter 20 and bore 22. Washer 14 prevents incoming gas from leaking out between nipple portion 16 and body 10. Gage 24, threadably received by body 10, reads inlet gas pressure, the gas flowing to gage 24 through channel 26 in body 10. Tire valve 28 is threadably received in the central channel portion 30 of body 10, and is located so as to block passage of gas through channel 30 except through the valve itself. A poppet in the tire valve is moveable to provide a variable restriction where the pressure drop occurs. It is moveable into and out of contact with a seat having an effective diameter of 0.101 inch, known as the valve hole diameter, the poppet being responsive to inlet gas pressure in a direction tending to close the valve. Filter 20 serves to keep the seat of valve 28 clean so that it is capable of fully shutting off. Located directly over channel 30 is wider cylindrical chamber 32 with countersunk upper portion. When uncompressed, stem 34 of tire valve 28 extends upward into chamber 32. Outlet tube 36 is threadably received by outlet chamber 38, which is connected with chamber 32. Seated in chamber 32 is slide 40, and positioned within the cylindrical cup portion of slide 40 is helical compression spring 42, which at its upper end bears against cap 44. Slide 40 must be deep enough to slide freely within chamber 32; thus the ratio of the overall contacting surface slide depth to the maximum outside diameter of slide 40 in chamber 32 should be at least 1, but is preferably made 1½. Cap 44 is threadably received by male threaded portion 46 of body 10. Calibrating stop ring 48 is glued by epoxy to the lower end of the inner perimeter of cap 44. Fitted around the 0.735 inch diameter neck 50 of body 10 is Parker Seal No. 8404-0075 rubber U-ring seal 52, having a pair of lips 52a joined by base 52b, with a 0.710 inch inner lip diameter, thereby providing an interference of 0.025 inch, the outer lip of seal 52 being squeezed by slide lip 54 from a diameter of 1.040 inches to fit within the 1.015 inches diameter of slide lip 54, which is spaced from the slide cup portion by collar 55. Gas entering chamber 32 pushes upward against slide 40 over an area having an effective diameter of 1.015 inches, known as the seal diameter. Because the interference is less than that normally used with U-rings in order to lessen friction, very small leaks (less than 0.001 lb./hour) can still occur. Therefore the U-ring is lubricated with a grease compatible with the gas chosen to prevent such leaks. Slide lip portion 54 rides against the outer lip of seal 52, as slide 40 moves vertically in chamber 32, guided by the narrower lower portion of chamber 32.

Seal 52 prevents gas in chamber 32 from flowing into cap chamber 56, which is vented to atmospheric pressure by hole 58. Hole 58 is needed to prevent slide 40 from trapping air which would restrain its motion and to compensate for leaks in seal 52 which otherwise would render the regulator inoperative. Atop cap 44 is logo disc 60.

In operation, nut 12 is screwed onto a tank of pressurized gas. Cap 44 is screwed down relative to body 10 compressing spring 42 which in turn pushes down on slide 40. Slide 40 depresses stem 34 of valve 28, fully opening tire valve 28. Gas at a higher pressure flows from the tank through nipple 18, opened valve 28, chamber 32, and chamber 38, and exits through outlet 36 at a lower pressure. Gas entering chamber 32 also presses upward against slide 40 against the force of spring 42. As long as gas pressure is below a certain amount, the spring will keep valve 28 fully opened. As the gas pressure in chamber 32 increases sufficiently to push slide 40 upward, stem 34 (which is resiliently biased upward in valve 28) will be allowed to rise and thus begin to close valve 28. As valve 28 begins to close, the pressure drop across valve 28 increases, thereby reducing gas pressure in chamber 32 until the spring force and the force of the gas are brought into equilibrium. The effect is to reduce a higher inlet pressure to a lower outlet pressure and to maintain that outlet pressure regardless of inlet pressure variation within a certain range.

Seal 52 prevents escape of gas to the outside through the slide-body fitting. As gas pressure in chamber 32 increases, it helps to spread apart the lips of U-ring 52 thereby to add to the U-ring spring effect and provide an improved sealing effect. The U-ring limits friction to 1-2 lb./inch of ring diameter or an acceptable 5 to 10% error when outlet pressure is from 15 to 25 psi. Hence any error caused by the effect of inlet pressure on the valve poppet subtracting from the force of spring 42 is kept within acceptable limits, since the seal diameter of 1.015 inches is large with respect to the valve hole diameter of 0.101 inch. Seal 52 also provides internal damping to eliminate any "hum" caused by valve vibrations.

Calibration of the regulator is achieved by screwing cap 44 down until the maximum desired outlet pressure is achieved. Stop ring 48 is then glued onto the inner circumference of cap 44 so that the bottom of ring 48 will rest flush with shoulder 62 of body 10. Thus cap 44 cannot be screwed down further. Likewise cap 44 cannot be unscrewed beyond the point where the top of ring 48 hits shoulder 64 of body 10. The dimensions of the body and stop ring are chosen so that at the uppermost position of cap 44 stem 34 is fully extended, closing valve 28. Hence the permitted travel of cap 44 provides a range of outlet pressure settings from zero to the desired maximum. By preventing unscrewing beyond a certain point, stop ring 48 also prevents cap 44 from accidentally coming off the regulator. Stop ring 48 further has three spaced high spots or protuberances 48a on its inner surface, each about 3/16 inch long circumferentially and 1/32 inch deep, which are squeezed against body 10 by cap 44 to provide a braking action against the accidental opening of the regulator should cap 44 be jarred, for example, by dropping. Cap 44 is made of polycarbonate plastic sold under the trademark Lexan. If a fixed-pressure regulator were desired, cap 44 would not move after manufacture, but would be pinned or glued in place.

Figure 3:
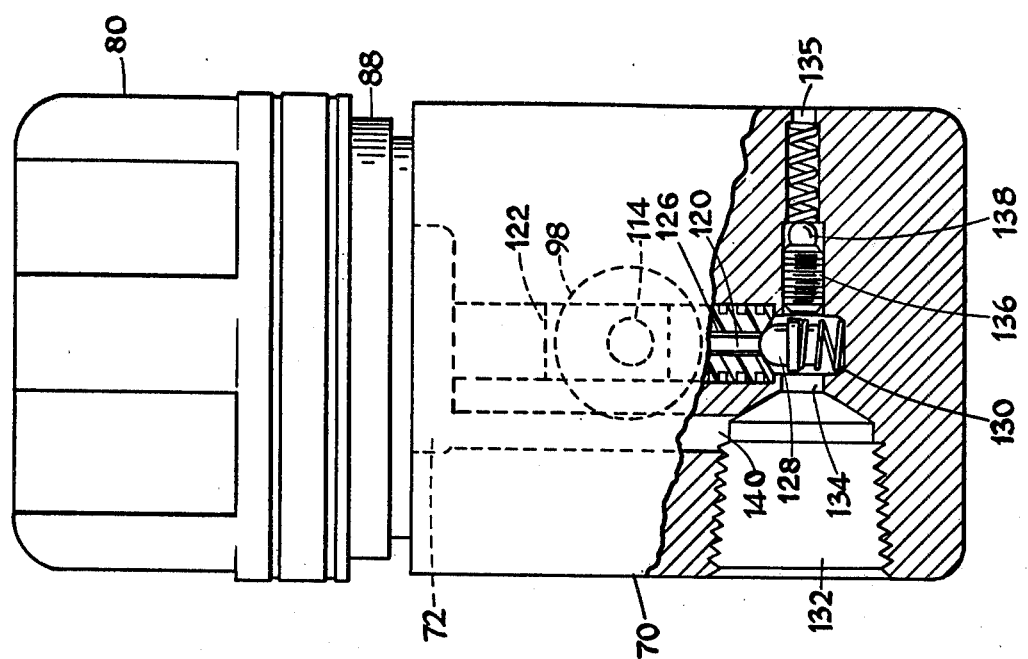
FIG. 3 is a view, partially broken away, at 3—3 of FIG. 2.
Figure 2:
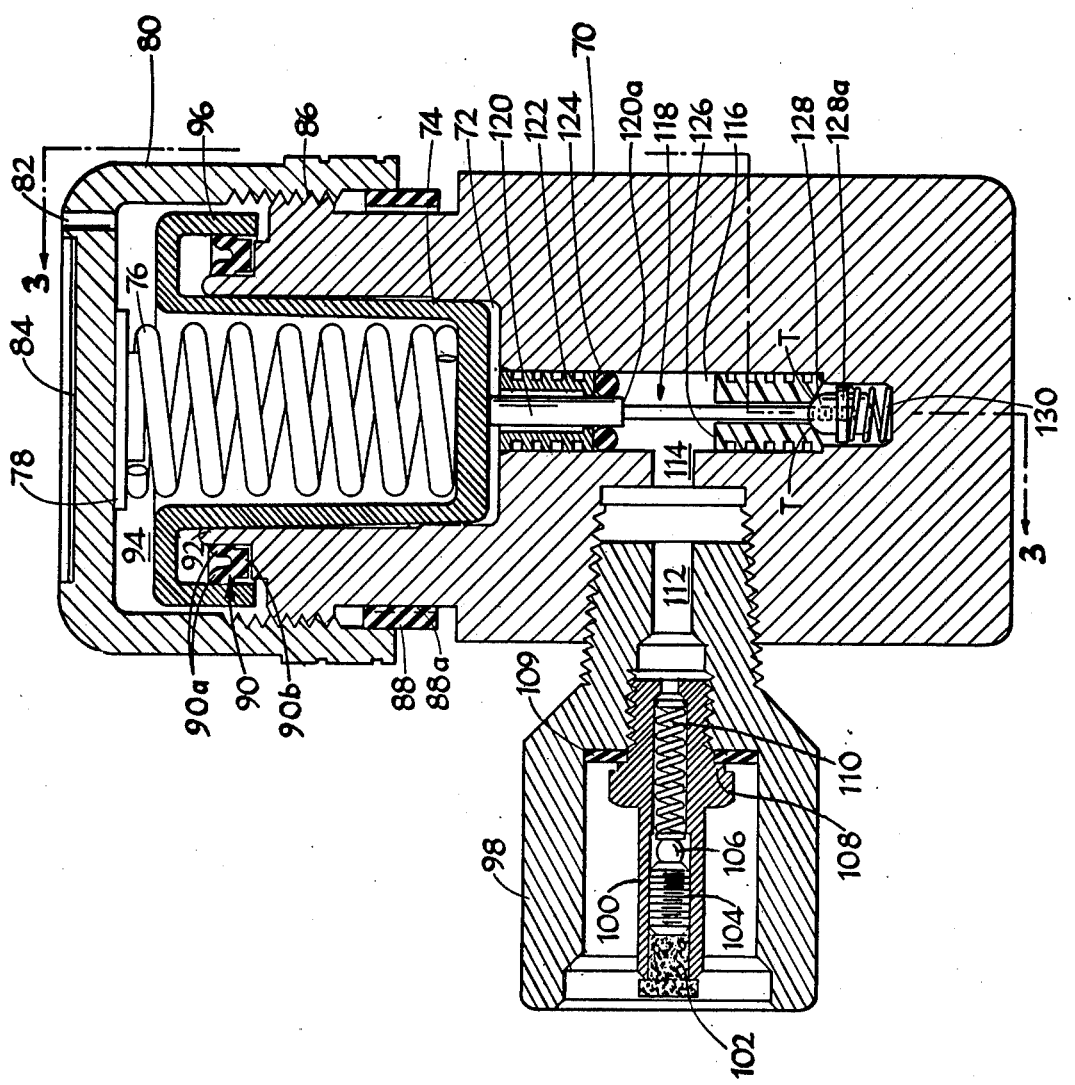
FIG. 2 is a sectional view, along a vertical plane, of another embodiment of the invention.

An alternative embodiment of the invention is the balanced pressure regulator shown in FIGS. 2 and 3. The regulator shown is adapted for use with gases under high pressure, such as oxygen at 3000 psi, which present extreme inlet pressure variation. The body-slide-spring-U-ring-cap arrangement of the regulator of FIG. 1 is substantially the same here. Body 70 has cylindrical countersunk slide chamber 72 which receives slide 74. Compression spring 76 is seated in the cup portion of slide 74, and bears upward against plate 78 affixed to cap 80, which has vent 82 and logo disc 84. Plate 78 protects cap 80 from being cut by the end of spring 76 with consequent damage to the cap and possible unwanted change in calibration. Threaded portion 86 of body 70 threadably receives cap 80. Calibration stop ring 88 with three spaced protuberances 88a having the same size as protuberances 48a is glued to the lower inner circumference of cap 80 in the same manner as described for the embodiment of FIG. 1. Rubber U-ring seal 90, which is the same size as seal 52 and comprises upwardly facing lips 90a joined by base 90b, is fitted around neck 92 of body 70, and seals off gas in chamber 72 from entering cap chamber 94. Seal 90, which is not lubricated when oxygen is used, has the same interference fit with neck 92 and slide lip 96, each of which respectively having the same dimensions as neck portion 50 and slide lip 54. Slide lip portion 96, spaced from the slide cup portion, rides against the outer lip of seal 90, as slide 74 moves vertically in chamber 72, guided by the narrower lower portion of chamber 72.

The gas inlet is provided within connector 98, which is threadably received by body 70. Connector 98 has a hollow inner portion which receives the opening of a tank of gas under high pressure. Centrally located within connector 98 is nipple 100, which has a filter 102, bushing 104, ball check valve 106, nipple pod 108 bearing against nipple gasket 109, and spring 110, the nipple having a threaded portion threadably received by connector 98. Nipple 100 opens into connector bore 112, which opens into inlet channel 114 on body 70. Channel 114 connects with valve channel 116 at a location intermediate of the length of channel 116.

Valve 118, preferred here over a tire valve because of the higher inlet pressures used which would be applied in this reverse direction of normal tire valve use, is located within valve channel 116, and comprises brass shaft 120, brass O-ring stop 122, O-ring 124, valve seat 126 made of acetal resin sold under the DuPont trademark Delrin, poppet 128 of polytetrafluoroethylene sold under the DuPont trademark Teflon, and compression spring 130. Stop 122 and seat 128 are respectively tightly fitted into the upper and lower portions of valve channel 116, and poppet 128 has a female threaded portion which engages the male threaded bottom portion of shaft 120.

The outlet arrangement is shown in FIG. 3. Threaded outlet chamber 132 is connected to valve channel 116 through channel 134, which also extends through body 70 thereby providing a second outlet through port 135. Seated within this extension of channel 134 are bushing 136 and safety ball check valve 138. Connecting outlet chamber 132 and slide chamber 72 is channel 140.

In operation, connector 98 is fitted on a tank of gas under high pressure. Gas will flow into nipple 100 through filter 102 and bushing 104, and will force open ball check valve 106 (biased by spring 110 in the closed position against bushing 104). Check valve 106 prevents back flow of gas from the regulator into the tank, caused for example, when one tank of a two-tank system is becoming empty. The gas continues through connector bore 112 and inlet channel 114 and into valve chamber 116. Sealed from slide chamber 72 by O-ring 124, the gas moves downward through the space between shaft 120 and seal 126. When cap 80 is screwed sufficiently downward, spring 76 will bias slide 74 against shaft 120, thereby moving shaft 120 and consequently poppet 128 downward and creating an opening between poppet and seal 126, where the pressure drop occurs. In the absence of any external bias, spring 310 pushes upward against poppet flange 128a, sealing the male hemispherical upper portion of poppet 128 against the female conical portion of seat 126, thereby closing valve 118. When valve 118 is biased open by slide 74, gas at a higher pressure flows through the opening between seat 126 and poppet 128 and into channel 134 at a lower pressure. The gas then leaves through outlet 132. Should the outlet become clogged or a blockage occur further downstream, the pent-up gas will pass through bushing 136, force open safety ball check valve 138, and exit through port 135 into the atmosphere. Check valves 106 and 138 are preferred for a two-tank system.

Outlet pressure in chamber 132 is communicated to slide chamber 72 by channel 140. If the outlet pressure increases beyond the desired maximum, the increased pressure will be communicated to chamber 72 and act upward against slide 74, counteracting the force of spring 76. As greater gas pressure moves slide 74 upward, shaft 120, biased upward by spring 130, is permitted to rise, thus drawing poppet 128 toward seat 126, thereby tending to close valve 118. As valve 118 begins to close, outlet pressure begins to decrease until the downward force (spring 76) and upward force (gas in chamber 72) are again in equilibrium. Thus a maximum outlet pressure is maintained.

Extreme variations in inlet pressure (e.g., as an oxygen tank empties, pressure will fall from 3000 psi to 0), which in the conventional pressure regulator would cause undesired swings in output pressure, are compensated for in the balanced regulator to maintain a constant outlet pressure. Inlet channel 114 enters chamber 116 at a point intermediate the length of valve 118. Hence inlet pressure bears upward against annular shoulder 120a of shaft 120 and downward against the annular area of poppet 128 located between the circumference of shaft 120 and the sealing circle T where poppet and seat touch. The diameters of shoulder 120a and sealing circle T are both 0.130 inch. By thus making these shoulder and poppet areas as projected in a plane equal, upward and downward inlet forces are kept in balance, and the effect of inlet pressure and variations in it on the movement of valve 118 is nullified. Only outlet pressure in chamber 72 affects the valve, as desired.

If greater flow capacity is desired, the diameters of shoulder 120a and sealing circle T could vary equally up to 0.2". Such an increase would mean less opening of valve 118 and less extension of spring 76 for a given increase in rate of flow of the gas with less falling off of the spring force and therefore less tendency for the outlet pressure to fall off.

Furthermore, in the embodiments shown a seal having only an outer resilient lip could be used provided that the inner periphery of the seal were tightly fitted to the body to provide a static seal therewith.

Other embodiments within the invention will be apparent to those skilled in the art.

What is claimed is:

1. A fluid pressure regulator comprising:
   a rectangular body, said body having
      a valve having at least two spaced apart opposed surfaces,
      a fluid inlet passage for transmitting said fluid to said valve at a first pressure,
         said fluid inlet passage being positioned to introduce fluid against said opposed surfaces of said valve, said valve being responsive in opening and closing directions to the net force of said fluid from said inlet passage on said surfaces, said net force being proportional to the difference in surface areas of said surfaces projected in a plane and said projected valve surface areas being equal so that the net force of said fluid from said inlet passage on said valve is substantially eliminated,
      a fluid outlet passage for transmitting said fluid from said valve at a second, lower, pressure,
      a valve outlet zone just downstream of said valve, and
      a cylindrical sealing portion,
         said valve being intermediate said fluid inlet passage and said fluid outlet passage,
         said valve being effective in continuing operation to reduce said first pressure to said second pressure,
   a slide mounted in said regulator body for reciprocal motion relative thereto with outside portions responsive to outlet pressure only,
      said slide having a blind hole extending axially thereof,
         said hole being of size large relative to the outside diameter of said slide, and oriented to provide in said slide a closed end which on its outer side is in communication with said valve outlet zone and an open end at the opposite end of said slide,
         said slide closed end engaging said valve to move it in an opening direction,
   a spring mounted in said hole, with one end supported by said closed end of said slide,
      said slide, at its open end, having an outward extension in the shape of an inverted U, including an outer lip extending away from said open end coaxial with said slide, said outer lip having an inner surface, said cylindrical sealing portion of said body extending into said inverted U, and closely adjacent to the innermost portion of said inverted U,
   a cap,
      said cap being mounted on said regulator body and engaging said spring at its end opposite said slide closed end to bias said spring thereagainst, and
   a U-ring,
      said U-ring having an annular base and a pair of concentrically spaced apart annular lips joined to said base, said base and said lips cooperating to define an annular groove between said lips, the lips of said U-ring having their inner portions oriented to receive device outlet pressure in said annular groove, said U-ring positioned in said inverted U, and said cylindrical sealing portion of said regulator body being spaced sufficiently from said inner surface of said slide outer lip to define an annular space therebetween large enough in cross section to receive said U-ring's annular base and pair of annular lips so that said U-ring extends between said inner surface of said slide outer lip and said cylindrical sealing portion and said annular groove in said U-ring can receive device outlet pressure, the inner of said U-ring's lips contacting said cylindrical sealing portion and the outer of said U-ring's lips contacting said inner surface of said slide outer lip.

2. The fluid pressure regulator of claim 1 wherein said valve has a poppet and a shaft, said poppet is connected to said shaft and reciprocally moveable with said shaft in valve opening and closing directions, said shaft has a shoulder, and said spaced apart opposed valve surfaces are respectively in said poppet and said shoulder.

3. The fluid pressure regulator of claim 2 wherein said body includes a first channel therein through which said shaft is reciprocally moveable and a seal located in said first channel between said shaft and said body for preventing the flow of fluid to said slide except through said valve outlet zone.

4. The fluid pressure regulator of claim 29 wherein said surface areas of said shoulder and said poppet have a diameter from 0.130 inch to 0.2 inch and said U-ring has an effective outer diameter at its lip of 1.015 inches.

5. The fluid pressure regulator of claim 2 wherein said poppet has a male hemispherical portion and said valve further comprises:
   a seat having a female conical portion for contacting said male hemispherical portion of said poppet and having an opening therethrough for passage of fluid from said fluid inlet passage to said fluid outlet passage, and
   a spring tending to move said male hemispherical portion of said poppet against said female conical portion of said seat so as to close said opening and thereby to close said valve, said seat being located between said fluid inlet passage and said poppet and said shaft extending through said opening in said seat.

6. The fluid pressure regulator of claim 3 wherein said communication between said valve outlet zone and said outer side of said slide closed end is provided by a second channel in said body through which fluid passes from said fluid outlet passage to said outside portions of said slide.

7. The fluid pressure regulator of claim 1 in which said spring extends above and below said U-ring.

8. The fluid pressure regulator of claim 1 in which said cap is screwthreadedly mounted on said pressure regulator body, whereby outlet pressure may be predeterminedly adjusted.

* * * * *